United States Patent
Tanaka

(10) Patent No.: US 9,500,937 B2
(45) Date of Patent: Nov. 22, 2016

(54) LIGHT SOURCE DEVICE FOR EMITTING WHITE LIGHT AND PROJECTION DISPLAY DEVICE USING THE SAME

(71) Applicant: PANASONIC CORPORATION, Osaka (JP)

(72) Inventor: Takaaki Tanaka, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 100 days.

(21) Appl. No.: 14/220,011

(22) Filed: Mar. 19, 2014

(65) Prior Publication Data

US 2014/0293232 A1   Oct. 2, 2014

(30) Foreign Application Priority Data

Mar. 27, 2013 (JP) .................................. 2013-065854
Jan. 28, 2014 (JP) .................................. 2014-012961

(51) Int. Cl.
G03B 21/20   (2006.01)

(52) U.S. Cl.
CPC ......... *G03B 21/204* (2013.01); *G03B 21/2066* (2013.01); *G03B 21/2073* (2013.01); *G03B 21/208* (2013.01)

(58) Field of Classification Search
CPC ............ G03B 21/204; G03B 21/2073; G03B 21/2066; H04N 9/3167; H04N 9/3158; H04N 9/3164; G02B 27/283; G02B 26/008; G02B 27/286
See application file for complete search history.

(56) References Cited

U.S. PATENT DOCUMENTS

| 8,740,388 B2* | 6/2014 | Okuda | G03B 21/14 349/7 |
| 9,046,745 B2* | 6/2015 | Chuang | G03B 21/005 |
| 2012/0081672 A1* | 4/2012 | Okuda | G03B 21/14 353/20 |
| 2012/0127435 A1 | 5/2012 | Kitano et al. | |
| 2012/0140183 A1 | 6/2012 | Tanaka et al. | |
| 2012/0249970 A1 | 10/2012 | Ishimatsu | |
| 2013/0176540 A1* | 7/2013 | Wei | G03B 21/204 353/20 |
| 2014/0055754 A1* | 2/2014 | Chuang | G03B 21/005 353/20 |

FOREIGN PATENT DOCUMENTS

| JP | 2004-341105 A | 12/2004 |
| JP | 2009-288437 A | 12/2009 |
| JP | 2012-108486 A | 6/2012 |
| JP | 2012-123179 A | 6/2012 |
| JP | 2012-137744 A | 7/2012 |
| JP | 2012-211983 A | 11/2012 |
| JP | 2013-076904 A | 4/2013 |

* cited by examiner

*Primary Examiner* — Bao-Luan Le
(74) *Attorney, Agent, or Firm* — McDermott Will & Emery LLP

(57) ABSTRACT

A light source device includes a light source, a first dichroic mirror, and a light emitting member. The light source is configured to emit blue light substantially polarized in a first direction. The first dichroic mirror is configured to reflect not less than 80% and not more than 90% of the blue light polarized in the first direction, and to transmit more than 10% and less than 20% of the blue light polarized in the first direction, in a wavelength band of blue light. The light emitting member is configured to emit light upon being excited by the blue light reflected by the first dichroic mirror.

7 Claims, 6 Drawing Sheets

LIGHT SOURCE DEVICE FOR EMITTING WHITE LIGHT AND PROJECTION DISPLAY DEVICE USING THE SAME

RELATED APPLICATIONS

This application claim the benefit of Japanese Application No. 2013-065854, filed on Mar. 27, 2013 and Japanese Application No. 2014-012961, filed Jan. 28, 2014, the disclosures of which Applications are incorporated by reference herein.

BACKGROUND

For light source devices of projection display devices, technologies using a phosphor and a laser servicing as a solid state light source have been known (see Japanese Patent Unexamined Publication No. 2012-137744, for example).

SUMMARY

A light source device includes a light source, a first dichroic mirror, and a light emitting member. The light source is configured to emit blue light that is polarized substantially in a first direction. The first dichroic mirror is configured to reflect not less than 80% and not more than 90% of the blue light polarized in the first direction, and to transmit larger than 10% and less than 20% of the blue light, in a wavelength band of blue light. The light emitting member is configured to emit light, upon being excited by the blue light reflected by the first dichroic mirror.

DETAILED DESCRIPTION

Hereinafter, detailed descriptions of embodiments will be made with reference to the accompanying drawings as deemed appropriate. However, descriptions detailed more than necessary will sometimes be omitted. For example, detailed descriptions of well-known items and duplicate descriptions of substantially the same configuration will sometimes be omitted, for the sake of brevity and easy understanding by those skilled in the art.

It is noted that the present inventors provide the accompanying drawings and the following descriptions so as to facilitate fully understanding of the present disclosure by those skilled in the art. The inventors in no way intend for the present disclosure to impose any limitation on the subject matter described in the appended claims.

1. General Outline of Projection Display Device

Figure 1:
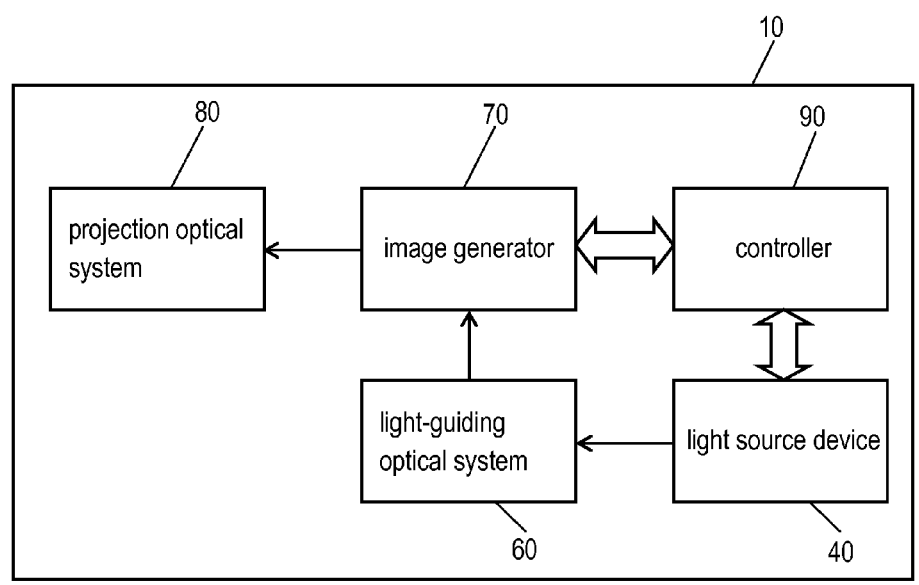
FIG. 1 is a block diagram of a configuration of a projection display device.

As shown in FIG. 1, projection display device 10 includes light source device 40, image generator 70 to generate an image in accordance with an image input signal, light-guiding optical system 60 to guide light from light source device 40 to image generator 70, projection optical system 80 to project the generated image onto a screen (not shown), and controller 90 to control light source device 40, image generator 70, and the like.

Light source device 40 according to the present disclosure includes, as an example, semiconductor lasers 20. Semiconductor lasers 20 excite, as an example, a phosphor to emit light. Light-guiding optical system 60 is configured with various kinds of optical members, typified by a lens, a mirror, and a rod. Light-guiding optical system 60 guides the light generated by light source device 40 to image generator 70. Image generator 70 has elements including a digital micro-mirror device (abbreviated as a DMD, hereinafter) and a liquid crystal panel. Image generator 70 spatially modulates the light in according to an image signal. Projection optical system 80 is configured with optical members including a lens and a mirror. Projection optical system 80 magnifies and projects the spatially modulated light.

2. Optical Configuration of Projection Display Device Using DMD

Figure 2:
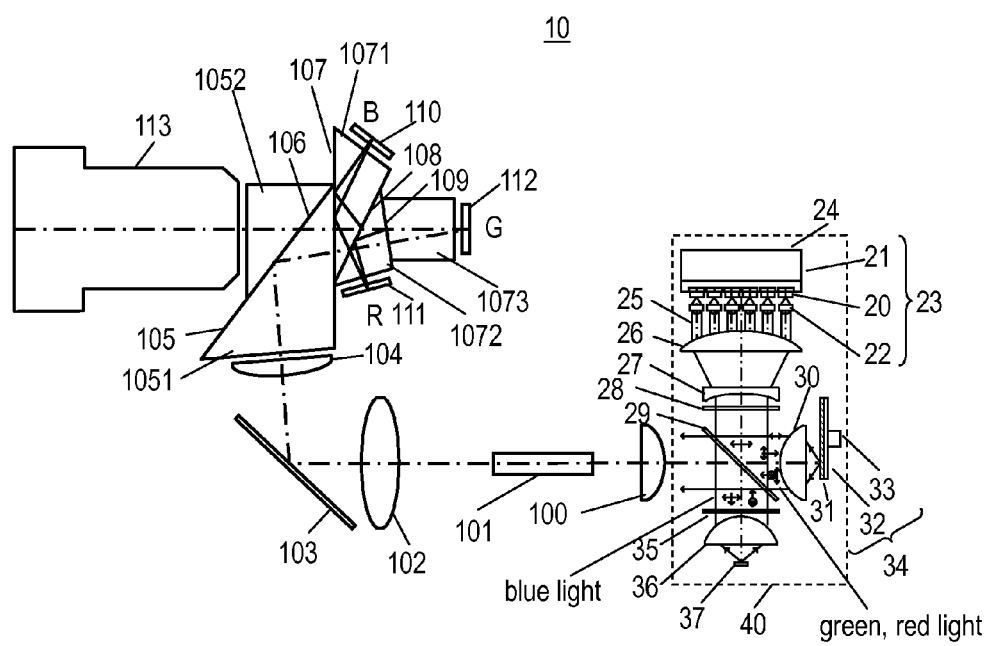
FIG. 2 is a schematic view illustrating an optical configuration according to an embodiment of the projection display device.

Projection display device 10 shown in FIG. 2 includes, as an example, light source device 40 and three DMDs 110, 111, and 112.

Light source device 40 generates white light, a mixture of blue light, red light, and green light. Light source device 40 emits the white light onto condensing lens 100. Condensing lens 100 condenses the white light. Condensing lens 100 emits the condensed white light onto rod 101. Rod 101 causes, in the inside thereof, the incident white light to be reflected multiple times, allowing the uniformalization of the light intensity distribution of the white light. Rod 101 emits the light with the thus-uniformed light intensity distribution onto relay lens 102. Relay lens 102 condenses and emits the white light onto mirror 103. Mirror 103 reflects the white light onto field lens 104. Field lens 104 transmits and guides the white light to total reflecting prism 105.

Total reflecting prism 105 is configured with two prisms 1051 and 1052. At the interface between prism 1051 and prism 1052, thin air layer 106 is formed. Air layer 106 causes a total reflection of the light incident at angles not smaller than the critical angle. Total reflecting prism 105 totally reflects the incident white light at air layer 106 so as to guide the light to color prism 107.

Color prism 107 is configured with three prisms 1071, 1072, and 1073. At the interface between prism 1071 and prism 1072, dichroic mirror 108 that reflects blue light is disposed. At the interface between prism 1072 and prism 1073, dichroic mirror 109 that reflects red light is disposed.

Color prism 107 splits the incident white light into blue light, red light, and green light, by using dichroic mirror 108 and dichroic mirror 109. Then, color prism 107 guides the blue light to DMD 110, the red light to DMD 111, and the green light to DMD 112.

Each of DMDs 110, 111, and 112 reflects the incident light of the respective color. Specifically, each of DMDs 110, 111, and 112 controls both the light to be incident on projection lens 113 and the light to be guided to the outside of an effective region of projection lens 113, by changing the directions of its micro-mirrors in accordance with the image signal.

DMDs 110, 111, and 112 reflect the blue light, the red light, and the green light, respectively, toward color prism 107. Color prism 107 generates an image light by combining the blue, red, and green light which are incident thereon. Color prism 107 guides the image light to total reflecting prism 105. Total reflecting prism 105 can transmit the image light because the image light is incident on air layer 106 at angles not larger than the critical angle. The image light is received by projection lens 113.

Projection lens 113 projects the image light on a screen (not shown).

Light source device 40 is configured with a plurality of solid state light sources (semiconductor lasers 20). Moreover, light source device 40 emits the white light with a high efficiency and a high degree of white balance, which allows projection display device 10 to have a long service life and high luminance. Furthermore, because image generator 70 is equipped with DMDs 110, 112, and 113, this configuration allows projection display device 10 to offer high resistance to light and heat, in comparison with the case where liquid crystal panels are employed. In addition, three DMDs 110, 112, and 113 allow a projection image to have a high degree of color reproducibility as well as high luminance and high definition.

Figure 3:
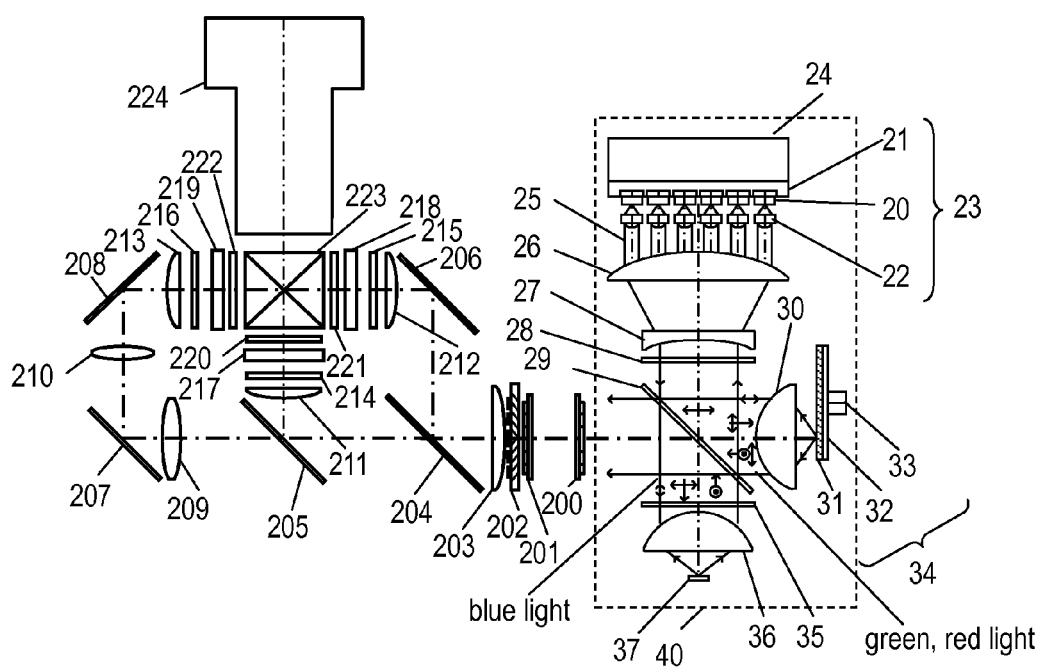
FIG. 3 is a schematic view illustrating an optical configuration according to another embodiment of the projection display device.

3. Optical Configuration of Projection Display Device Using Liquid Crystal Panels Projection display device 15 shown in FIG. 3 includes, as an example, light source device 40, three liquid crystal panels 217, 218, and 219.

Light source device 40 generates white light, a mixture of blue light, red light, and green light. Light source device 40 emits the white light toward first lens array plate 200 configured with a plurality of lens elements. First lens array plate 200 devides the incident white light into a large number of luminous fluxes. Second lens array plate 201 causes the large number of the divided luminous fluxes to converge. Second lens array plate 201 guides the converging white light to polarization conversion element 202. The lens elements included in first lens array plate 200 have openings similar in shape to openings of liquid crystal panels 217, 218, and 219. Each of lens elements included in second lens array plate 201 is configured to have a focal length such that first lens array plate 200 has a substantially conjugate relation with liquid crystal panels 217, 218, and 219.

Polarization conversion element 202 is configured with a polarized-light separation prism and a half-wave plate. Polarization conversion element 202 converts random polarized light into light polarized in one polarization direction (S-polarized light, as an example, in the present disclosure). Polarization conversion element 202 guides the S-polarized light to superimposition lens 203.

Superimposition lens 203 has a function of superimposing the luminous fluxes, one on another, emitted from the lens elements of second lens array plate 201, and a function of guiding the thus-superimposed light to liquid crystal panels 217, 218, and 219.

Dichroic mirror 204 reflects the blue light of the light emitted from superimposition lens 203. Mirror 206 reflects the blue light toward field lens 212. Field lens 212 transmits and guides the blue light to incident-side polarizing plate 215. Incident-side polarizing plate 215 transmits and guides the blue light to liquid crystal panel 218. That is, the blue light is incident on liquid crystal panel 218.

Dichroic mirror 205 reflects the green light of the light emitted from superimposition lens 203, toward field lens 211. Field lens 211 transmits and guides the green light to incident-side polarizing plate 214. Incident-side polarizing plate 214 transmits and guides the green light to liquid crystal panel 217. That is, the green light is incident on liquid crystal panel 217.

Relay lenses 209 and 210 and mirrors 207 and 208 are used to guide the red light to field lens 213. This is because the red light has a longer optical path than the blue light and the green light. Field lens 213 transmits and guides the red light to incident-side polarizing plate 216. Incident-side polarizing plate 216 transmits and guides the red light to liquid crystal panel 219. That is, the red light is incident on liquid crystal panel 219.

Each of three liquid crystal panels 217, 218, and 219 converts the polarization state of the light incident thereon, in accordance with the image signal.

In the incident side of liquid crystal panel 217, incident-side polarizing plate 214 is disposed. In the emission side, emission-side polarizing plate 220 is disposed. Incident-side polarizing plate 214 and emission-side polarizing plate 220 are disposed such that their transmission axes are orthogonal to each other. With these configurations, a blue color image is formed.

In the incident side of liquid crystal panel 218, incident-side polarizing plate 215 is disposed. In the emission side, emission-side polarizing plate 221 is disposed. Incident-side polarizing plate 215 and emission-side polarizing plate 221 are disposed such that their transmission axes are orthogonal to each other. With these configurations, a green color image is formed.

In the incident side of liquid crystal panel 219, incident-side polarizing plate 216 is disposed. In the emission side, emission-side polarizing plate 222 is disposed. Incident-side polarizing plate 216 and emission-side polarizing plate 222 are disposed such that their transmission axes are orthogonal to each other. With these configurations, a red color image is formed.

Color combing prism 223 combines the green, blue, and red light transmitted through emission-side polarizing plates 220, 221, and 220, respectively, which thereby results in the synthesis of an image light. Color combing prism 223 guides the image light to projection lens 224. Projection lens 224 receives the image light.

Projection lens 224 projects the image light onto a screen (not shown).

Light source device 40 is configured with a plurality of solid state light sources (semiconductor lasers 20). Moreover, light source device 40 emits the white light with a high efficiency and a high degree of white balance, which allows projection display device 15 to have a long service life and high luminance.

Furthermore, image generator 70 is equipped with three liquid crystal panels 217, 218, and 219 that employ, not a time sharing method, but the light polarizing method. This allows the prevention of a color breaking phenomenon (color persistence noises), which results in the projection image with a high degree of color reproducibility, high luminance, and high definition.

In addition, compared to the case where three DMDs are used, the total reflecting prism is not necessary, and the color combing prism can be configured to be a smaller-sized one for 45° incident light. This allows smaller-sized projection display device 15.

4. Configuration of Light Source Device 40

Hereinafter, a first exemplary embodiment and a second exemplary embodiment will be described concerning light source device 40.

4-1. First Exemplary Embodiment

4-1-1. Travel Path of Light

A general outline of travel paths of light in light source device 40 shown in FIG. 4 will be described, hereinafter. P-polarized blue light emitted from semiconductor lasers 20 is transmitted through condensing lenses 22, convex lens 26, and concave lens 27. The blue light transmitted through concave lens 27 is incident on first dichroic mirror 29, via diffusing plate 28. Upon being incident on first dichroic mirror 29, one part of the P-polarized blue light is reflected and the other part is transmitted.

The P-polarized blue light reflected by first dichroic mirror 29 is incident on phosphor plate 34 having phosphor layer 31, via condensing lens 30. The blue light incident on phosphor plate 34 excites phosphor contained in phosphor layer 31. Phosphor layer 31 emits mixed light of green light and red light. The mixed light is transmitted through first dichroic mirror 29. After having been transmitted through first dichroic mirror 29, the mixed light travels to light-guiding optical system 60.

The P-polarized blue light transmitted through the first dichroic mirror 29 is incident on diffusing/reflecting plate 37, via quarter-wave plate 35 and condensing lens 36, with the blue light being turned into circularly-polarized light. The blue light reflected by diffusing/reflecting plate 37 is incident on first dichroic mirror 29, via condensing lens 36 and quarter-wave plate 35, with the blue light being turned into S-polarized light. First dichroic mirror 29 reflects the S-polarized blue light. The blue light reflected by first dichroic mirror 29 travels to light-guiding optical system 60.

Figure 4:
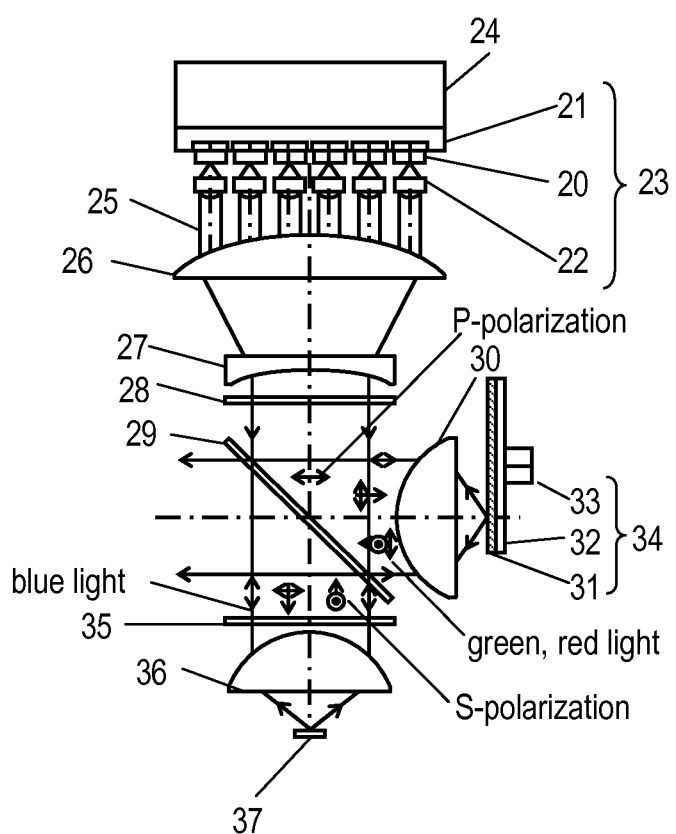
FIG. 4 is a schematic view illustrating an optical configuration of a light source device according to a first embodiment.

As shown in FIG. 4, in the present disclosure, the P-polarization means the polarization in a direction parallel to the plane of paper of FIG. 4; the S-polarization means the polarization in a direction perpendicular to the plane of paper of FIG. 4. Note, however, that the P-polarized blue light may contain other polarization components besides P-polarization one. That is, it is only required for the blue light to be substantially P-polarized. As long as the blue light is substantially P-polarized, it does not depart from the scope of the technologies disclosed herein. Like this, the S-polarized blue light may contain other polarization components besides S-polarization ones. That is, it is only required for the blue light to be substantially S-polarized. As long as the blue light is substantially S-polarized, it does not depart from the scope of the technologies disclosed herein.

4-1-2. Configuration

Hereinafter, the configuration of light source device 40 shown in FIG. 4 will be described in detail. Light source device 40 includes solid state light source unit 23. Solid state light source unit 23 includes a plurality of semiconductor lasers 20 disposed on heat dissipating plate 21. The plurality of semiconductor lasers 20 is arranged in a square array of 6 pieces×4 rows at regular intervals, for an example. A plurality of condensing lenses 22 is disposed to face the plurality of semiconductor lasers 20, respectively on an each-to-each basis.

With heat dissipating plate 21, heat sink 24 is coupled. Heat sink 24 cools solid state light source unit 23. Semiconductor lasers 20 emit linearly-polarized blue light with wavelengths of not less than 440 nm and not more than 455 nm. Each of semiconductor lasers 20 is disposed such that the light emitted from semiconductor laser 20 is subjected to P-polarization with respect to the plane of incidence of first dichroic mirror 29.

Each of condensing lenses 22 condenses the light emitted from semiconductor laser 20 and converts it into parallel luminous flux 25. Use of both convex lens 26 and concave lens 27 allows the smaller-sized group of a plurality of luminous fluxes 25.

Diffusing plate 28 diffuses the group of luminous fluxes 25. Diffusing plate 28 is a glass plate with a fine concave-and-convex surface structure, for an example. Diffusing plate 28 is such that the half-value angle (diffusion angle) at which intensity of the diffused light becomes 50% of its maximum value is approximately 3 degrees, for an example. Such the small half-value angle allows reduced variations in the polarization property.

First dichroic mirror 29 is disposed such that the blue light from light source device 40 is incident on the mirror at 45 degrees. In addition, first dichroic mirror 29 is disposed such that the mixed light from phosphor plate 34, to be described in detail later, is incident on the mirror at 45 degrees. First dichroic mirror 29 is equipped with a dichroic film (not shown). The dichroic film is configured with a multilayer dielectric film composed of various kinds of optical thin films. The dielectric film is configured including a high refractive index film such as $TiO_2$ (titanium dioxide), a low refractive index film such as $SiO_2$ (silicon dioxide), and a mid refractive index film.

Figure 5:
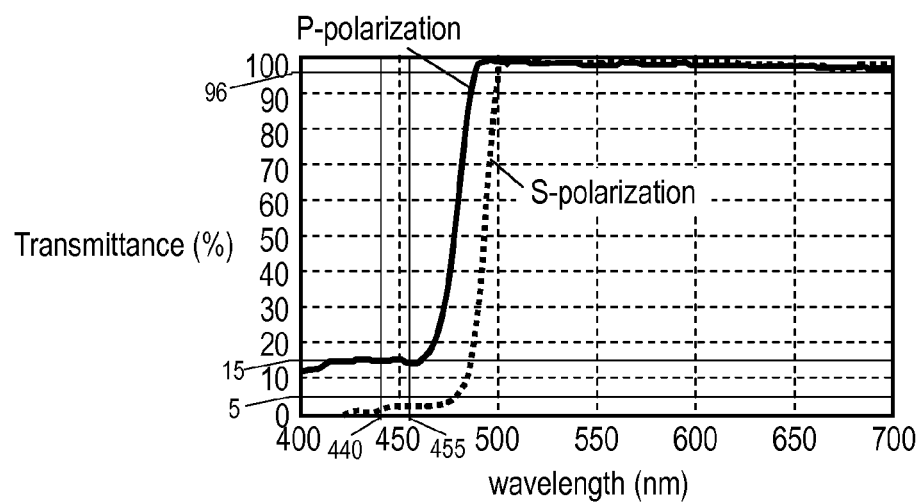
FIG. 5 is a graph showing spectral characteristics of a dichroic mirror for 45° incident light, according to the first embodiment.

As shown in FIG. 5, first dichroic mirror 29 in the present disclosure partially transmits and partially reflects P-polarized light with wavelengths of not less than 440 nm and not more than 455 nm, a transmission of 15% in average and a reflection of 85% in average, for an example. First dichroic mirror 29 reflects not less than 95% in average of the S-polarized light with wavelengths of not less than 440 nm and not more than 455 nm. That is, first dichroic mirror 29 substantially totally reflects the S-polarized light with wavelengths of not less than 440 nm and not more than 455 nm.

First dichroic mirror 29 transmits not less than 96% of light with wavelengths of not less than 500 nm, regardless of its polarization, i.e. P-polarization or S-polarization. That is, first dichroic mirror 29 substantially totally transmits the green light and the red light, regardless of their polarization whether they are subjected to P-polarization or S-polarization.

In cases of conventional dichroic mirrors, the half-value wavelength at which transmittance becomes 50% is different by approximately 20 nm between P-polarization and S-polarization. Specifically, when the design is made using laser light with an average wavelength of 448 nm, the half-value wavelengths of the P-polarized light and the S-polarized light are 438 nm and 458 nm, respectively. For the laser light with a wavelength bandwidth of 15 nm, i.e. not less than 440 nm and not more than 455 nm, the use of the conventional dichroic mirrors offers a transmittance of 64% for P-polarized light at a wavelength of 440 nm in the shorter wavelength side, and a reflectance of 72% for S-polarized light at a wavelength of 455 nm in the longer wavelength side.

That is, the conventional dichroic mirrors are not capable of offering both the reflectance of not less than 85% for the P-polarized light with the wavelengths of not less than 440 nm and not more than 455 nm, and the reflectance of not less than 95% for the S-polarized light with the wavelengths of not less than 440 nm and not more than 455 nm.

For this reason, conventionally, a half-wave plate has been used depending on the wavelength band of the light incident on the dichroic mirror, in order to obtain a desired ratio between the transmitted light and the reflected light. However, the half-wave plate has a durability problem when it is configured using a stretched film. In addition, the half-wave plate has a high-cost problem when it is configured using an optical crystal, such as quartz crystal.

Hence, in the present disclosure, no half-wave plate is used. According to the present disclosure, the characteristics of first dichroic mirror 29 allow the separation of the blue light emitted from semiconductor lasers 20 into the transmitted light and the reflected light, at a certain ratio between the intensities of the two.

As shown in FIG. 4, condensing lens 30 superimposes the P-polarized blue luminous fluxes reflected by first dichroic mirror 29, one on another, so as to form a spot diameter of 1 mm to 2 mm. In the present disclosure, the spot diameter is defined as the diameter at which the light intensity becomes 13.5% of the peak intensity. The diffusion characteristics of diffusing plate 28 are only requested to be designed such that the luminous flux incident on phosphor plate 34 has the desired spot diameter described above, with diffusing plate 28 and condensing lens 30.

Phosphor plate 34 is a rotation-controllable circular substrate which includes a reflection film (not shown), aluminum substrate 32 having phosphor layer 31, and motor 33 disposed in the center part of aluminum substrate 32. The reflection film included in phosphor plate 34 is a metal film or a dielectric film which reflects visible light. The reflection film is formed on aluminum substrate 32. Phosphor layer 31 is formed on the reflection film. Phosphor layer 31 includes Ce-activated YAG-type yellow phosphor, as an example, that emits yellow light containing green and red components, upon being excited by blue light. That is, phosphor layer 31 is excited by the blue light to emit mixed light of green light and red light. Note that the mixed light emitted from phosphor layer 31 toward the reflection film is reflected by the reflection film. The mixed light is random-polarized light. Note that, in the present disclosure, the typical chemical formula of the crystal matrix of the phosphor is $Y_3Al_5O_{12}$. Phosphor layer 31 is formed in an annular ring shape with a width.

Phosphor plate 34 prevents a temperature rise of phosphor layer 31 due to the excitation light; two factors are responsible for this prevention, i.e. high thermal conductivity of aluminum substrate 32 and rotation of the plate. Accordingly, phosphor plate 34 is capable of holding the stable fluorescence conversion efficiency.

Condensing lens 30 condenses the mixed light (containing the reflected light by the reflection film) emitted from phosphor plate 34 to form parallel light. First dichroic mirror 29 transmits the mixed light based on the characteristics shown in FIG. 5.

Quarter-wave plate 35 servicing as a phase difference plate converts the P-polarized blue light transmitted through first dichroic mirror 29, into circularly-polarized light. Quarter-wave plate 35 is the phase difference plate, the quarter wavelength of which is equal to the phase difference of light close in wavelength to the light emitted by semiconductor lasers 20. Quarter-wave plate 35 is configured with a quartz crystal, a stretched film, or the like.

Condensing lens 36 condenses the circularly-polarized blue light. The focal length of condensing lens 36 parallels that of condensing lens 30. Condensing lens 36 forms a condensed light spot at the vicinity of the surface of diffusing/reflecting plate 37. The spot diameter of the blue light condensed by condensing lens 36 parallels that of the blue light condensed by condensing lens 30. With this configuration, uniformity of the white light formed by combining the mixed light and the blue light is ensured.

Diffusing/reflecting plate 37 diffuses the circularly-polarized blue light, i.e. the incident laser light, to render its light intensity distribution uniform. Moreover, diffusing/reflecting plate 37 reduces speckles of the laser light, and reflects it toward condensing lens 36. Diffusing/reflecting plate 37 has a diffusion surface on one side of a thin glass plate, and a reflection film on the other side. The diffusion surface is configured with a fine concave-and-convex structure formed on the surface of the thin glass plate. The reflection film is configured with, such as, an aluminum film or a multilayer dielectric film. Diffusing/reflecting plate 37 provides a diffusion angle of approximately 7 degrees per one time of transmission through the diffusion surface. Such the small diffusion angle allows reduced variations in polarization characteristics.

Diffusing/reflecting plate 37 reflects the diffused light. In addition, diffusing/reflecting plate 37 reverses the phase of the circularly-polarized light; that is, the reflected light turns into a circularly-polarized light with the rotation direction opposite to that of the incident light.

Condensing lens 36 condenses the reflected light. Quarter-wave plate 35 converts the circular polarized light incident on quarter-wave plate 35 into S-polarized light. First dichroic mirror 29 reflects the S-polarized blue light based on the characteristics shown in FIG. 5. That is, first dichroic mirror 29 forms white light by combining the mixed light and the S-polarized blue light. Thus, light source device 40 emits the white light. The white light according to the present disclosure has a high degree of white balance, which results from the green light, the red light, and the blue light, with both the green and the red being contained in the mixed light. When the white light according to the present disclosure is split into three primary colors of blue, green, and red with the optical system of the projection display device, it is possible to obtain monochromatic light with desired chromaticity coordinates.

4-1-3. Summary of the First Exemplary Embodiment

Light source device 40 according to the first embodiment includes semiconductor lasers 20, first dichroic mirror 29, and phosphor plate 34. Semiconductor lasers 20 are configured to emit the substantially P-polarized blue light (not less than 440 nm and not more than 455 nm). First dichroic mirror 29 is configured to reflect not less than 80% and not more than 90% of the P-polarized blue light, and to transmit more than 10% and less than 20% of the blue light. Phosphor plate 34 is configured to emit light, upon being excited by the blue light reflected by first dichroic mirror 29. Phosphor plate 34 is configured to emit the mixed light, i.e. the mixture of the red light and the green light, toward first dichroic mirror 29. The light source device further includes quarter-wave plate 35 and diffusing/reflecting plate 37. Quarter-wave plate 35 gives a quarter-wave phase difference to the blue light polarized in the first direction, transmitted through first dichroic mirror 29, which thereby converts the blue light into the circularly-polarized light. Diffusing/reflecting plate 37 reflects the blue light toward the first dichroic mirror 29 side, with the circularly-polarized blue light being transmitted through quarter-wave plate 35 to be converted into the S-polarized blue light perpendicular to P-polarization. First dichroic mirror 29 is configured to substantially totally transmit the mixed light, configured to substantially totally reflect the S-polarized blue light, and configured to combine the green light, the red light, and the blue light, with both the green and the red being contained in the mixed light.

In the present disclosure, first dichroic mirror 29 splits the P-polarized light with wavelengths of not less than 440 nm and not more than 455 nm, at a certain ratio of intensities; the characteristics of the dichroic mirror provide the transmittance of 15% and the reflectance of 85%. If the transmittance of the P-polarized light is not more than 10%, the amount of the blue light becomes insufficient. Therefore, the amount of the mixed light has to be reduced in order to maintain the white balance within a certain range, which results in a decrease in luminance of the white light emitted from light source device 40. Moreover, if the transmittance of the P-polarized light is not less than 20%, it entails an increase in the transmittance of the S-polarized light at wavelengths of not less than 440 nm and not more than 455 nm, and also entails a decrease in the amount of the light to excite phosphor layer 31, which results in a decrease in the amount of the mixed light. Therefore, it becomes difficult to maintain the white balance within a certain range.

For the reason described above, first dichroic mirror 29 is preferably configured such that it reflects not less than 80% and not more than 90% of the P-polarized blue light, it transmits more than 10% and less than 20% of the P-polarized blue light, and it substantially totally reflects the S-polarized blue light. In accordance with the configuration described above, it is possible to optimize the ratio between the amounts of the blue light and the mixed light so as to obtain the maximum luminance, with the white balance being maintained in a certain range.

4-2. Second Exemplary Embodiment

4-2-1. Travel Path of Light

Figure 6:
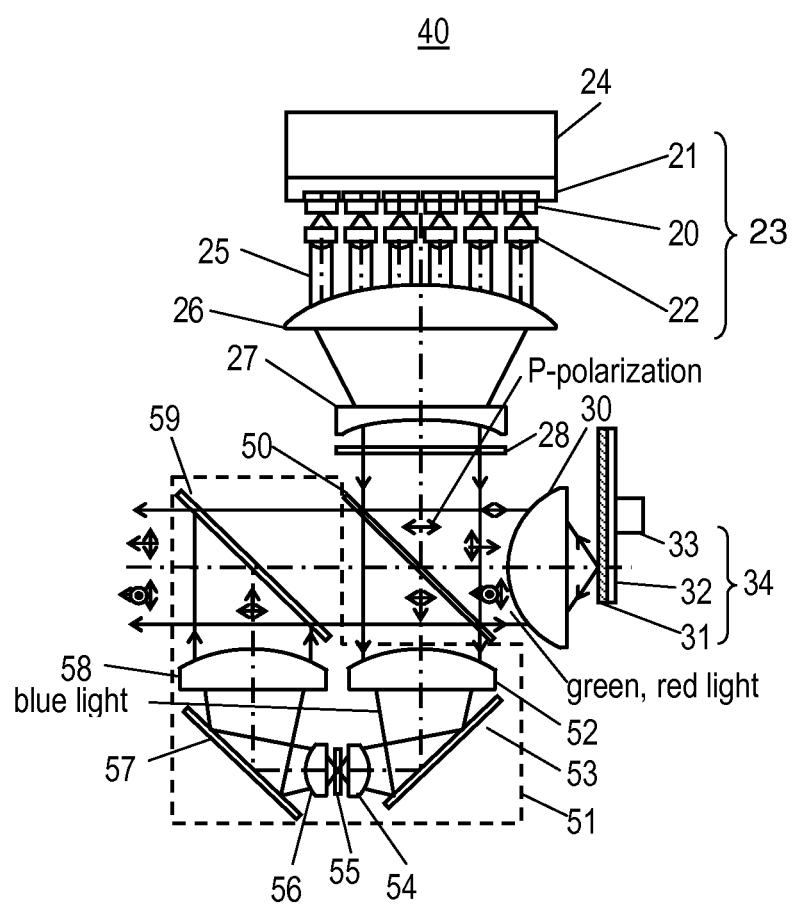
FIG. 6 is a schematic view illustrating an optical configuration of a light source device according to a second embodiment.

A general outline of travel paths of light in light source device 40 shown in FIG. 6 will be described, hereinafter. P-polarized blue light emitted from semiconductor lasers 20 is transmitted through condensing lenses 22, convex lens 26, and concave lens 27. The blue light transmitted through concave lens 27 is incident on first dichroic mirror 50, via diffusing plate 28. Upon being incident on first dichroic mirror 50, one part of the P-polarized blue light is reflected and the other part is transmitted.

The P-polarized blue light reflected by first dichroic mirror 50 is incident on phosphor plate 34 having phosphor layer 31, via condensing lens 30. The blue light incident on phosphor plate 34 excites phosphor contained in phosphor layer 31. Phosphor layer 31 emits mixed light of green light and red light. The mixed light is transmitted through first dichroic mirror 50. After having been transmitted through first dichroic mirror 50, the mixed light is transmitted through second dichroic mirror 59 to travel to light-guiding optical system 60.

The P-polarized blue light transmitted through first dichroic mirror 50 is transmitted through relay optical system 51 to travel to light-guiding optical system 60. The blue light is incident on second dichroic mirror 59, via relay optical system 51 including a plurality of condensing lenses 52, 54, 56, and 58 and a plurality of mirrors 53 and 57. Second dichroic mirror 59 reflects the blue light. The blue light reflected by second dichroic mirror 59 travels to light-guiding optical system 60.

4-2-2. Configuration

Hereinafter, the configuration of light source device 40 shown in FIG. 6 will be described in detail. The descriptions will be focused mainly on differences from the first embodiment.

First dichroic mirror 50 according to the second embodiment partially transmits and partially reflects P-polarized light with wavelengths of not less than 440 nm and not more than 455 nm, a transmission of 15% in average and a reflection of 85% in average, for an example.

First dichroic mirror 50 transmits not less than 96% of light with wavelengths of not less than 500 nm, regardless of its polarization, i.e. P-polarization or S-polarization. That is, first dichroic mirror 50 substantially totally transmits the green light and the red light, regardless of their polarization whether they are subjected to P-polarization or S-polarization.

The difference of first dichroic mirror 50 from first dichroic mirror 29 is in that there is no need for defining the reflectance for the S-polarized light with wavelengths of not less than 440 nm and not more than 455 nm. Accordingly, the number of layers of optical thin films disposed in first dichroic mirror 50 can be set to be smaller than the number of layers of the optical thin films disposed in first dichroic mirror 29. This allows first dichroic mirror 50 to cost less in manufacturing than first dichroic mirror 29.

Relay optical system 51 is configured with the plurality of condensing lenses 52, 54, 56, and 58, the plurality of mirrors 53 and 57, second diffusing plate 55, and second dichroic mirror 59.

Mirror 53 and condensing lenses 52 and 54 condense the P-polarized blue light transmitted through first dichroic mirror 50, onto second diffusing plate 55. The focal length of the combination of condensing lenses 52 and 54 parallels that of condensing lens 30. The combination of condensing lenses 52 and 54 forms a condensed light spot at the vicinity of the surface of second diffusing plate 55. The spot diameter of the blue light condensed by the combination of condensing lenses 52 and 54 parallels that of the blue light condensed by condensing lens 30.

The diffusion surface of second diffusing plate 55 is configured with a fine recess-and-protrusion structure formed on the surface of a thin glass plate. Second diffusing plate 55 provides a diffusion angle of approximately 7 degrees per one time of transmission through the diffusion surface. The small diffusion angle allows reduced variations in polarization characteristics.

Mirror 57 and condensing lenses 56 and 58 convert the light diffused by second diffusing plate 55 into substantially parallel light. The focal length of the combination of condensing lenses 56 and 58 is equal to that of the combination of condensing lenses 52 and 54.

Second dichroic mirror 59 reflects not less than 96% of the P-polarized light with wavelengths of not less than 440 nm and not more than 455 nm.

Second dichroic mirror 59 substantially totally reflects the substantially parallel blue light. Second dichroic mirror 59 transmits not less than 96% of light with wavelengths of not less than 500 nm, regardless of its polarization, i.e. P-polarization or S-polarization. That is, second dichroic mirror 59 substantially totally transmits green light and red light, regardless of their polarization whether they are subjected to P-polarization or S-polarization.

That is, second dichroic mirror 59 forms white light by combining the mixed light and the P-polarized blue light. Thus, light source device 40 emits the white light. The white light according to the present disclosure has a high degree of white balance, which results from the green light, the red light, and the blue light, with both the green and the red being contained in the mixed light. When the white light according to the present disclosure is split into three primary colors of blue, green, and red with the optical system of the projection display device, it is possible to obtain monochromatic light with desired chromaticity coordinates.

4-2-3. Summary the Second Exemplary Embodiment

Light source device 40 according to the second embodiment includes semiconductor lasers 20, first dichroic mirror 50, phosphor plate 34, and second dichroic mirror 59. Semiconductor lasers 20 are configured to emit the substantially P-polarized blue light (not less than 440 nm and not more than 455 nm). First dichroic mirror 50 is configured to reflect not less than 80% and not more than 90% of the P-polarized blue light, and to transmit more than 10% and less than 20% of the blue light. Phosphor plate 34 is configured to emit light upon being excited by the blue light reflected by first dichroic mirror 50. Phosphor plate 34 is configured to emit the mixed light, i.e. the mixture of the red light and the green light, toward first dichroic mirror 50. First dichroic mirror 50 is configured to substantially totally transmit the mixed light. Second dichroic mirror 59 is configured to substantially totally transmit the mixed light transmitted through first dichroic mirror 50, and to substantially totally reflect the blue light transmitted through first dichroic mirror 50, thereby combining the green light, the red light, and the blue light, with both the green and the red being contained in the mixed light.

In the present disclosure, first dichroic mirror 50 splits the P-polarized light with wavelengths of not less than 440 nm and not more than 455 nm, at a certain ratio of intensities; the characteristics of the mirror provide the transmittance of 15% and the reflectance of 85%. If the transmittance of the P-polarized light is not more than 10%, the amount of the blue light becomes insufficient. Therefore, the amount of the mixed light has to be decreased in order to maintain the white balance within a certain range, which results in a decrease in luminance of the white light emitted from light source device 40. Moreover, if the transmittance of the P-polarized light is not less than 20%, it entails a decrease in the amount of the light to excite phosphor layer 31, which results in a decrease in the amount of the mixed light. Therefore, it becomes difficult to maintain the white balance within a certain range.

For the reason described above, first dichroic mirror 50 is preferably configured such that it reflects not less than 80% and not more than 90% of the P-polarized blue light, and it transmits more than 10% and less than 20% of the P-polarized blue light. In accordance with the configuration described above, it is possible to optimize the ratio between the amounts of the blue light and the mixed light so as to obtain the maximum luminance, with the white balance being maintained in a certain range.

5. Advantages

Light source device 40 according to the present disclosure includes semiconductor lasers 20, first dichroic mirror 29, 50, and phosphor plate 34. Semiconductor lasers 20 are configured to emit the substantially P-polarized blue light (not less than 440 nm and not more than 455 nm). First dichroic mirror 29, 50 is configured to reflect, at wavelengths of blue light, not less than 80% and not more than 90% of the P-polarized blue light, and to transmit more than 10% and less than 20% of the P-polarized blue light. Phosphor plate 34 is configured to emit light upon being excited by the blue light reflected by first dichroic mirror 29, 50.

In light source device 40 according to the present disclosure, there is no need for using a half-wave plate to cause both the transmitted light and the reflected light to be in a desired ratio, at a location between semiconductor lasers 20 and first dichroic mirror 29, 50. This is resulted from the combination of the polarization characteristics of the blue light emitted from semiconductor lasers 20 and the characteristics of first dichroic mirror 29, 50.

Consequently, light source device 40 according to the present disclosure is advantageous, from viewpoints of durability or cost, over the case where the half-wave plate is used.

Note that, in the present disclosure, the descriptions have been made using the cases where the emission wavelength of semiconductor lasers 20 is not less than 440 nm and not more than 455 nm, as an example. However, the emission wavelength band of semiconductor lasers 20 is not limited to the above example. Even when the wavelength band with a width of 15 nm is shifted (for example, not less than 447 nm and not more than 462 nm, or alternatively not less than 457 nm and not more than 472 nm), it is only required to modify the characteristics of first dichroic mirror 29, 50 in accordance with the wavelength of semiconductor lasers 20. That is, it is only required that first dichroic mirror 29, 50 is configured to reflect not less than 80% and not more than 90% of the P-polarized blue light, and to transmit more than 10% and less than 20% of the P-polarized blue light, at wavelengths of blue light.

Moreover, in the present disclosure, the descriptions have been made using the cases where one solid state light source unit 23 is used; however, a plurality of solid state light source units may be used. In this case, a mirror is used to combine the light emitted from the plurality of solid state light source units.

As described above, the embodiments have been described as exemplifications of the technologies according to the present disclosure. For that purpose, the accompanying drawings and the detailed descriptions have been presented.

Moreover, it should be noted that the embodiments described above have been given solely for the purpose of exemplifying the technologies according to the present disclosure. Consequently, it is apparent that the embodiments may be subjected to various kinds of modification, replacement, addition, and omission without departing from the scope of the appended claims and the scope of their equivalents.

What is claimed is:

1. A light source device comprising:
   a light source for emitting blue light substantially polarized in a first direction;
   a first dichroic mirror for reflecting not less than 80% and not more than 90% of the blue light polarized in the first direction, and for transmitting more than 10% and less than 20% of the blue light, at a wavelength of the blue light; and a light emitting member for emitting light upon being excited by the blue light reflected by the first dichroic mirror.

2. The light source device according to claim 1, wherein the light emitting member emits mixed light, a mixture of red light and green light.

3. The light source device according to claim 2, wherein the light emitting member emits the mixed light toward the first dichroic mirror, and the first dichroic mirror substantially totally transmits the mixed light.

4. The light source device according to claim 3, further comprising:
- a wave plate for converting the blue light polarized in the first direction into circularly-polarized blue light, by giving a quarter-wave phase difference to the blue light transmitted through the first dichroic mirror; and
- a reflecting member for reflecting the circularly-polarized blue light toward the first dichroic mirror so as to polarize the blue light in a direction perpendicular to the first direction by transmitting the blue light through the wave plate,
- wherein the first dichroic mirror substantially totally reflects the blue light polarized in the direction perpendicular to the first direction, and combines the green light, the red light, and the blue light, the green light and the red light being contained in the mixed light.

5. The light source device according to claim 3, further comprising a second dichroic mirror for combining the green light, the red light, and the blue light, by substantially totally transmitting the mixed light transmitted through the first dichroic mirror and by substantially totally reflecting the blue light transmitted through the first dichroic mirror, the green light and the red light being contained in the mixed light.

6. A projection display device comprising:
- an image generator for generating an image in accordance with an image input signal;
- a light source device for emitting white light formed by combining green light, red light, and blue light;
- a light-guiding optical system for guiding the white light to the image generator; and
- a projection optical system for projecting the image, wherein the light source device includes:
- a light source for emitting the blue light substantially polarized in a first direction;
- a first dichroic mirror for reflecting not less than 80% and not more than 90% of the blue light polarized in the first direction, and for transmitting more than 10% and less than 20% of the blue light polarized in the first direction, at a wavelength of the blue light;
- a light emitting member for emitting light upon being excited by the blue light reflected by the first dichroic mirror, the light emitting member emitting mixed light toward the first dichroic mirror, the mixed light being a mixture of the red light and the green light;
- a wave plate for converting the blue light polarized in the first direction into circularly-polarized blue light, by giving a quarter-wave phase difference to the blue light transmitted through the first dichroic mirror; and
- a reflecting member for reflecting the circularly-polarized blue light toward the first dichroic mirror so as to polarize the blue light in a direction perpendicular to the first direction by transmitting the blue light through the wave plate,
- wherein the first dichroic mirror substantially totally transmits the mixed light, substantially totally reflects the blue light polarized in the direction perpendicular to the first direction, and combines the green light, the red light, and the blue light, the green light and the red light being contained in the mixed light.

7. A projection display device comprising:
- an image generator for generating an image in accordance with an image input signal;
- a light source device for emitting white light formed by combining green light, red light, and blue light;
- a light-guiding optical system for guiding the white light to the image generator; and
- a projection optical system for projecting the image, wherein the light source device includes:
- a light source for emitting the blue light substantially polarized in a first direction;
- a first dichroic mirror for reflecting not less than 80% and not more than 90% of the blue light polarized in the first direction, and for transmitting more than 10% and less than 20% of the blue light polarized in the first direction, at a wavelength of the blue light;
- a light emitting member for emitting light upon being excited by the blue light reflected by the first dichroic mirror, the light emitting member emitting mixed light toward the first dichroic mirror, the mixed light being a mixture of the red light and the green light; and
- a second dichroic mirror,
- wherein the first dichroic mirror substantially totally transmits the mixed light, and the second dichroic mirror combines the green light, the red light, and the blue light by substantially totally transmitting the mixed light transmitted through the first dichroic mirror and by substantially totally reflecting the blue light transmitted through the first dichroic mirror, the green light and the red light being contained in the mixed light.

* * * * *